United States Patent
Zagajac et al.

(10) Patent No.: US 11,080,996 B2
(45) Date of Patent: Aug. 3, 2021

(54) DYNAMIC TRAFFIC CONTROL SYSTEMS

(71) Applicant: FORD GLOBAL TECHNOLOGIES, LLC, Dearborn, MI (US)

(72) Inventors: Jovan Milivoje Zagajac, Ann Arbor, MI (US); Erik Kiledal, Hillsdale, MI (US); John Walpuck, West Bloomfield, MI (US); Thomas E. Apczynski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 16/219,005

(22) Filed: Dec. 13, 2018

(65) Prior Publication Data
US 2020/0193811 A1 Jun. 18, 2020

(51) Int. Cl.
 *G08G 1/01* (2006.01)
 *G08G 1/16* (2006.01)
 *H04W 4/46* (2018.01)

(52) U.S. Cl.
 CPC ......... *G08G 1/0141* (2013.01); *G08G 1/0112* (2013.01); *G08G 1/161* (2013.01); *G08G 1/166* (2013.01); *H04W 4/46* (2018.02)

(58) Field of Classification Search
 CPC .... G08G 1/0141; G08G 1/161; G08G 1/0112; G08G 1/166; G08G 1/0145; G08G 1/07; G08G 1/096805; H04W 4/46; H04W 4/027; H04W 4/029; H04L 2209/84; H04L 9/3239; H04L 63/105; H04L 2209/38

See application file for complete search history.

(56) References Cited

U.S. PATENT DOCUMENTS

| | | |
|---|---|---|
| 2018/0061237 A1 | 3/2018 | Erickson et al. |
| 2018/0122234 A1 | 5/2018 | Nascimento et al. |
| 2018/0262865 A1* | 9/2018 | Lepp ................. H04W 52/0235 |

OTHER PUBLICATIONS

VanMiddlesworth, Mark, Dresner, Kurt, Stone, Peter; May 2008, University of Texas, the fifth workshop on agents in traffic and transportation multiagent systems, pp. 94-101 (Year: 2008).*
Kalyanasundaram, Longesh veera kumar,Trustworthy Intersection Management by Crowd-sourced Digital Environment Information 2017, University of Gothenburg, pp. 4-5, 8,12, and 16-18 (Year: 2017).*
Texas Department of Transportation, Move over or Slow Down, TxDot, Nov. 19, 2013, p. 1 (Year: 2013).*
Leiding, Benjamin, Memarmoshrefi, Parissa, Hogrefe, Dieter, Self-managed and Blockchain-based Vehicular Ad-hoc Networks, 2016, UBICOMP/ISWC, pp. 137-140 (Year: 2016).*

(Continued)

*Primary Examiner* — Aniss Chad
*Assistant Examiner* — Chase L Cooley
(74) *Attorney, Agent, or Firm* — Michael J. Spenner; Brooks Kushman P.C.

(57) ABSTRACT

A vehicle includes a controller. The controller is programmed to broadcast state information for the vehicle and receive state information from other vehicles; identify a contested roadway area for the vehicle and another of the vehicles based on expected future paths of the vehicle and the other vehicle calculated per the state information; and update a ledger with an indication of which of the vehicle or the other vehicle is agreed to proceed through the contested roadway area.

14 Claims, 7 Drawing Sheets

(56) References Cited

OTHER PUBLICATIONS

Kalyanasundaram, Logesh veera kumar, "Trustworthy Intersection Management by Crowd-Sourced Digital Environment Information," Master's Thesis in Computer Systems and Networks, Chalmers University of Technology, University of Gothenburg, 2017.

Hyperledger-Fabricdocs Documentation, Release Master, Oct. 17, 2018.

Gordon, James, "Blockchain: The Hidden Costs," Traffic Technology International Magazine, www.traffictechnologytoday.com, Aug./Sep. 2018.

* cited by examiner

DYNAMIC TRAFFIC CONTROL SYSTEMS

TECHNICAL FIELD

Aspects of the disclosure generally relate to dynamic traffic control systems.

BACKGROUND

Traffic control systems include markers, signs, and signal devices used to inform, guide, and control traffic. Traffic lights are an example of a dynamic traffic control, as they cycle in state to let vehicles take turns to proceed. Traffic lights are centralized control systems, in that they make decisions on what vehicles are next to proceed through the light, without regard to other entities.

SUMMARY

In one or more illustrative examples, a vehicle includes a controller programmed to broadcast state information for the vehicle and receive state information from other vehicles; identify a contested roadway area for the vehicle and another of the vehicles based on expected future paths of the vehicle and the other vehicle calculated per the state information; and update a ledger with an indication of which of the vehicle or the other vehicle is agreed to proceed through the contested roadway area.

In one or more illustrative examples, a method includes, responsive to detecting a conflict between traffic participants for use of a contested roadway area, performing distributed conflict resolution by the traffic participants to identify an ordering of the traffic participants to have exclusive access to the contested roadway area; using a distributed ledger to record agreement of the traffic participants to the ordering; and recording into the ledger signals representative of movement of the traffic participants within the contested roadway area.

In one or more illustrative examples, a non-transitory computer-readable medium comprising instructions of a dynamic traffic control system for performing distributed conflict resolution that, when executed by processors of traffic participants, causes the traffic participants to broadcast state information for the traffic participant; receive broadcast state information from other traffic participants; use maintained map information to identify expected future paths of the traffic participants per the state information; responsive to detecting a conflict between traffic participants for use of a contested roadway area, perform distributed conflict resolution by the traffic participants to identify an ordering of the traffic participants to have exclusive access to the contested roadway area; use a distributed ledger to record agreement of the traffic participants to the ordering; and record into the ledger signals representative of movement of the traffic participants within the contested roadway area.

DETAILED DESCRIPTION

Figure 1:
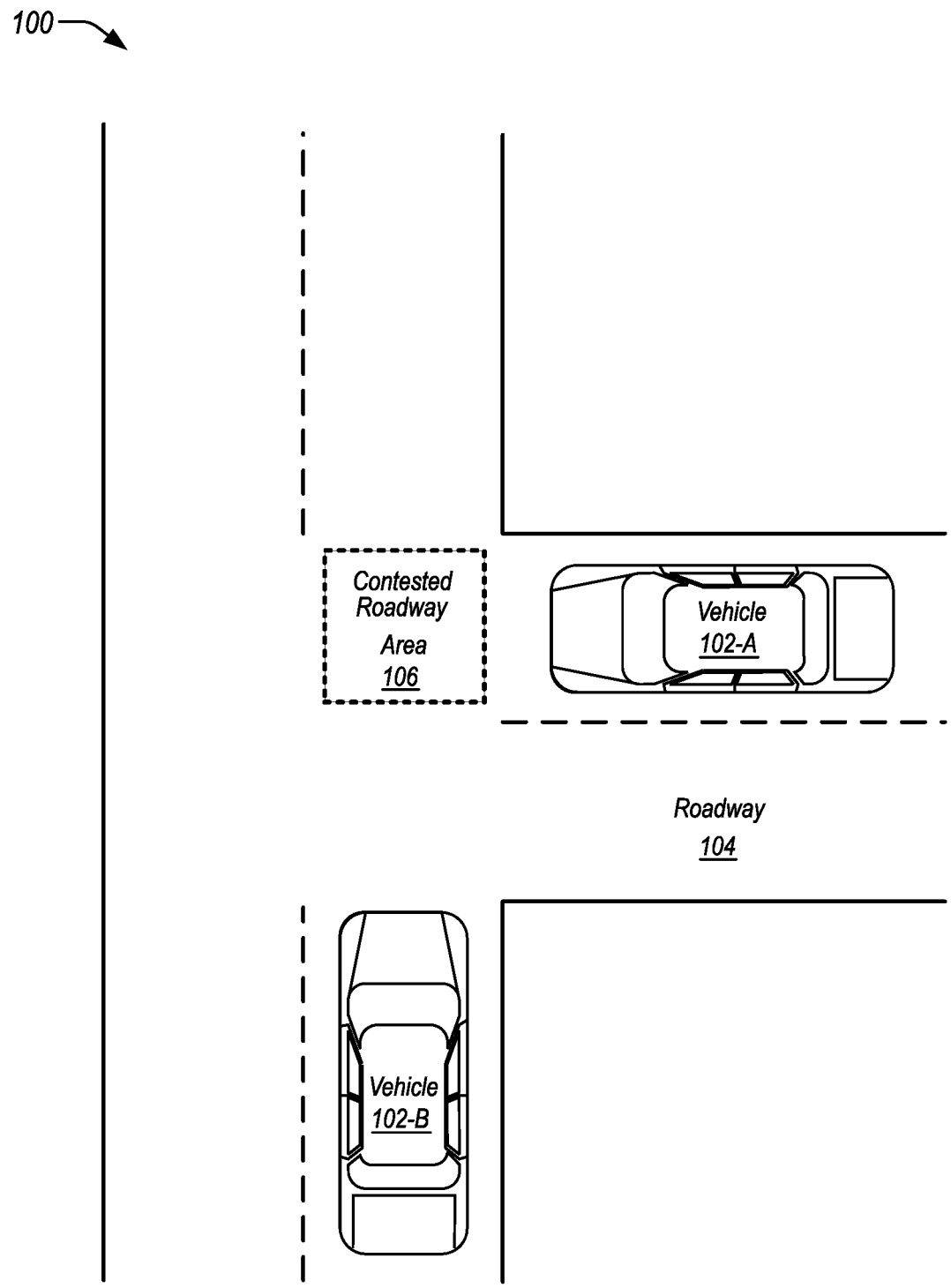
FIG. 1 illustrates an example diagram of connected vehicles traversing a roadway having a contested roadway area.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A roadway is an asset that is shared by vehicles traveling from one location to another. However, only a single vehicle can use a portion of a roadway at once. A dynamic traffic control system may be used to establish contractual relationships between roadway users to allow the users to gain and release exclusive access to portions of roadway as needed. To do so, the dynamic traffic control system utilizes trust between traffic participants, high-performance application execution, secure communication to establish a contract of passage, consensus among traffic participants to determine transactions that assign ownership of roadway segments to vehicles, and permanent and secure storage of the transactions of the system in a distributed ledger.

The system may utilize a conflict resolver to schedule sequential use of the portions of roadway in cases where multiple vehicles require use of the same roadway portion. Various rules may be used by the resolver to determine the priority of vehicles to be given access. A shared definition of roadway may be used to aid in the referencing of the shared roadway areas. This controlled sharing of roadway assets may be performed in a distributed manner by the vehicles themselves.

To support data analysis of vehicle movements (for example to support forensic data analysis by law enforcement personnel conducting accident investigations or for traffic flow optimization studies by departments of transportation), the system may store vehicle movements, vehicle status, and environmental sensor data synchronized with the roadway ownership assignments.

The dynamic traffic control system may be implemented by a centralized system or a decentralized system. The main differences between a centralized and decentralized system are the implementation of the consensus system and the storage of the ledger. The consensus system is the system to permit a transaction to be entered into the ledger. In a centralized system, consensus is implicitly managed (vehicles are instructed) and the ledger may be stored in a secure location. In a decentralized system, the implementation of the traffic control system may be a collaborative effort of the vehicles involved in the conflict, using as input a detailed description of the intersection (map data), local traffic laws and regulations, as well as the current and predicted paths of the vehicles. To ensure that all parties in the conflict resolution process are authorized and trusted, the system will use certificate authentication and encryption. The ledger in such a distributed implementation may be distributed as well. In an example, a distributed ledger may be used to maintain a distributed record of the locking and unlocking of shared roadway assets. In addition to providing order for the user of shared roadway assets, the ledger data may be used to provide a forensic ability to play back the movement of the traffic. Further aspects of the disclosure are discussed in detail herein.

FIG. 1 illustrates an example diagram 100 of connected vehicles 102-A and 102-B (collectively 102) traversing a roadway 104 having a contested roadway area 106. The vehicles 102 may include various types of automobile, crossover utility vehicle (CUV), sport utility vehicle (SUV), truck, recreational vehicle (RV), boat, plane or other mobile machine for transporting people or goods. In many cases, the vehicles 102 may be powered by an internal combustion engine. As some other possibilities, the vehicles 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). A connected vehicle 102 refers to a vehicle 102 configured with equipment that enables real-time, low-latency communication with other vehicles 102, infrastructure, and data networks.

A roadway 104 may be defined as a portion of a road intended for normal vehicular traffic. A contested roadway area 106 may be defined as any map region where roadway lane geometry is such that there exists one or more areas that have a potential for concurrent occupancy of vehicles 102 and other road users (sometimes referred to herein as traffic participants) during normal usage. As shown, the vehicle 102-A and the vehicle 102-B both require use of a portion of an intersection to continue their travel. Accordingly, this area is a contested roadway area 106.

It should be noted that contested roadway areas 106 are dynamic, not static. For example, once one of the vehicles 102 continues through the illustrated intersection, the area of the intersection is no longer required for use by both vehicles 102. As a result, the contested roadway area 106 no longer exists. It should also be noted that the size and shape of contested roadway areas 106 varies based on the size and shape of the roadway 104 that is desired for use by two or more vehicles 102.

Vehicles 102 operating in an unmanaged contested roadway area 106 face a challenge of negotiating safe passage without unintended concurrent occupancy of the roadway area 104. The disclosed systems and methods provide an approach to allow the vehicles 102 to cooperate to efficiently traverse concurrently through an unmanaged contested roadway area 106 to a desired destination.

Figure 2:
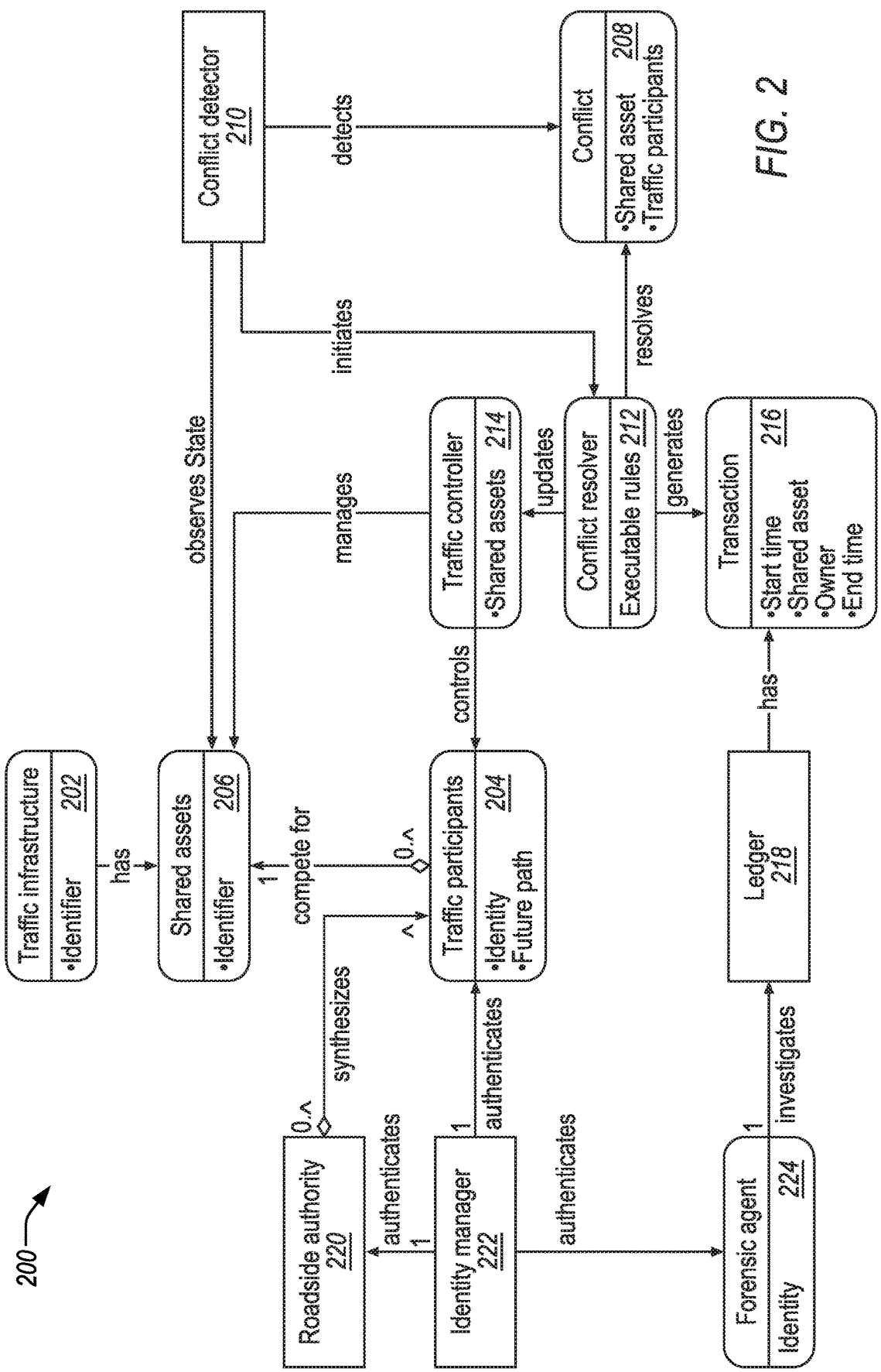
FIG. 2 illustrates an example model for elements used to perform roadway conflict detection and resolution.

FIG. 2 illustrates an example model 200 for elements used to perform roadway conflict detection and resolution. The model 200 is based on the entities and elements that are used in the conflict detection and conflict resolution. It should be noted that the model 200 is merely an example that is useful to explain the operation of the roadway conflict detection and resolution, and other models 200 having more, fewer, or different elements may be utilized as well.

A traffic infrastructure 202 includes road segments and other assets used by traffic participants to facilitate movement between locations. A traffic infrastructure 202 element may be used to model the elements of traffic infrastructure 202 with a unique identifier that identifies a set of roadway 104 elements or other roadway infrastructure 340. In an example, a city or a subset of a city may be defined as its own traffic infrastructure 202. In another example, roadways may be defined as a set of traffic infrastructure, while waterways or another unrelated system of traffic infrastructure 202 may be defined with a different unique identifier.

A traffic participant 204 is an entity which makes use of the traffic infrastructure 202. Examples of traffic participants include vehicles 102 or pedestrians. A traffic participant 204 element models a traffic participant 204. Each traffic participant 204 may be modeled to include an identity of the participant, such as a name or other user identifier, along with a future path of the traffic participant. The future path refers to an expected future route of the participant 204 of sufficient duration to be useful in evaluating whether there is a possibility of occurrence of a roadway conflict.

A shared asset 206 is a part of the traffic infrastructure 202 which may have concurrent access requests. Examples of shared asset 206 elements include road segments that are part of an intersection, highway lanes, and parking spots. A shared asset 206 element may model a shared asset 206 using a unique identifier that stands for that particular asset 206. Each traffic infrastructure 202 element has one or more shared asset 206 elements.

A conflict exists whenever there is an imminent concurrent access to a shared asset 206 by two or more traffic participants 204. A conflict element 208 may model a conflict using an identifier of the conflicted shared asset 206 as well as with identifiers of the two or more traffic participants 204 who require imminent concurrent access to the shared asset 206.

A conflict detector 210 is a hardware or software element that detects conflicts based on the current and intended future path of the traffic participants 204. The conflict detector 210 observes the state of the shared asset 206, and if a conflict is detected, the conflict detector 210 creates a conflict element 208.

A conflict resolver 212 assigns sequential access to a shared asset 206 to all participants in a conflict and generates transactions. To do so, the conflict resolver 212 determines the access order according to a prevailing set of rules. Such rules may include traffic laws, directives by governing departments of transportation (DOT), inherent or earned elevated privileges of passage. The conflict detector 210 may initiate the conflict resolver 212 to resolve a conflict indicated by a conflict element 208 generated by the conflict detector 210.

A traffic controller 214 directs the flow of traffic participants 204 across shared assets 206 as directed by the conflict resolver 212. The traffic controller 214 may be centralized or decentralized. Examples of centralized traffic controllers 214 include traffic lights, signage, and law enforcement. Examples of decentralized traffic controllers 214 include peer-to-peer collaborative controllers implemented by traffic participants 204.

A transaction record 216 is a record which grants a unique owner of a shared asset 206 to a traffic participant 204 for a specified time period. Each transaction record 216 may include fields such as a start time, an end time, an identifier of a shared asset 206, and an identifier of a traffic participant 204 that owns the shared asset 206. A ledger 218 is a totally-ordered set of transaction records 216. A ledger 218 may be centralized or decentralized.

A roadside authority 220 is an entity which is authorized to influence the management of shared assets 206. Example roadside authorities 220 include roadside sensors, devices that receive information from maintenance crews, and devices that receive information from law enforcement personnel.

An identity manager 222 controls access to participate in privileged operations such as access to shared assets 206, ledgers 218, and roadside authorities 220.

A forensic agent entity 224 is an entity with authority to access the ledger 218 for the purpose of digital forensic investigation. In an example, if an incident occurs between traffic participants 204, the forensic agent entity 224 may utilize the ledger 218 to reconstruct the timeline surrounding the incident.

Figure 3:
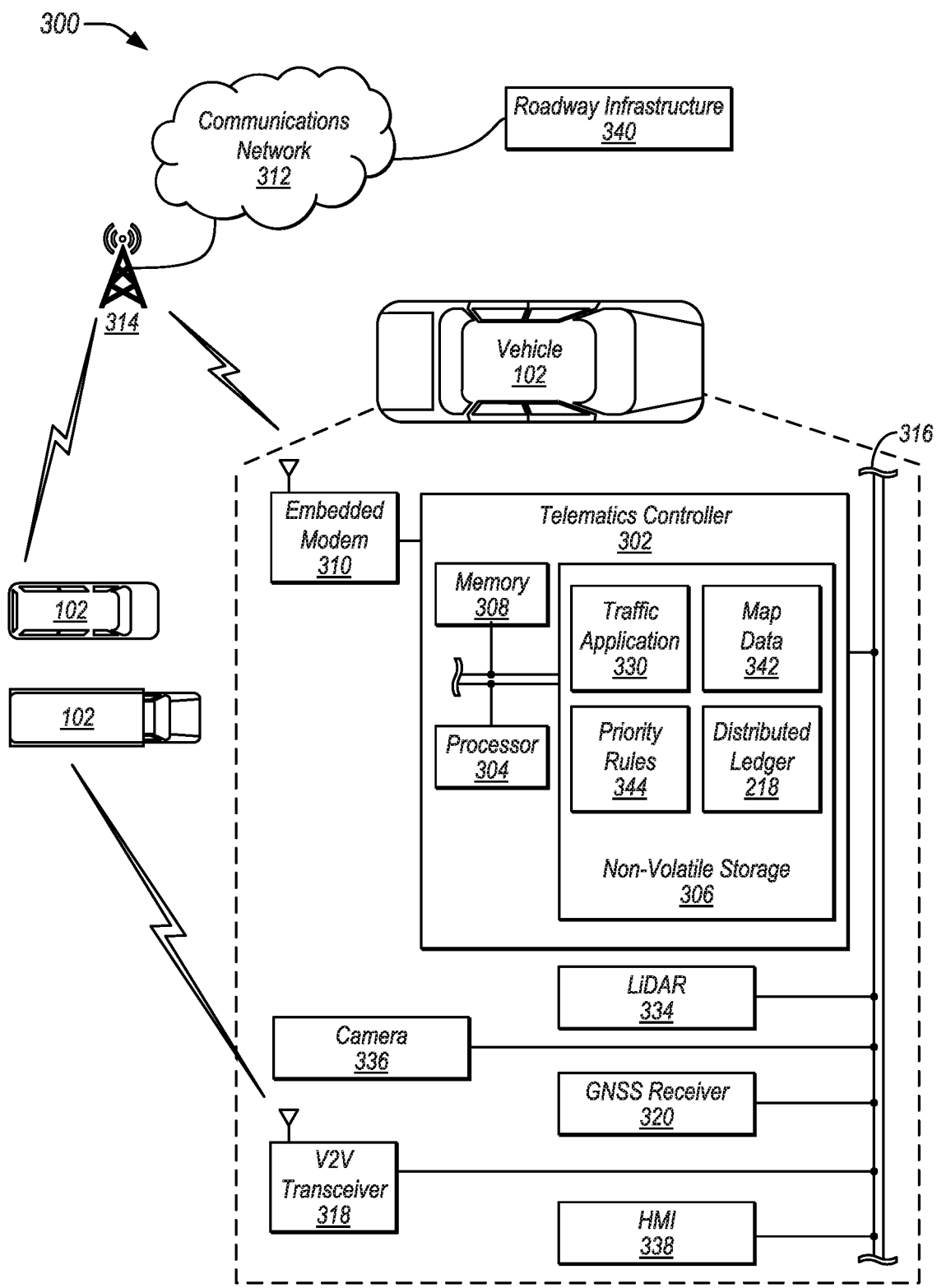
FIG. 3 illustrates an example system for managing contested roadway areas.

FIG. 3 illustrates an example system 300 for managing contested roadway areas 106. Using aspects of the model 200, vehicles 102 in the system 300 can implement conflict detection and conflict resolution. To facilitate the management of the contested roadway areas 106, the system 300 may utilize a traffic application 330 installed to a telematics controller 302 of the vehicle 102.

The telematics controller 302 may include one or more processors 304 configured to perform instructions, commands, and other routines in support of the processes described herein. Such instructions, and other data may be maintained in a non-volatile manner using a variety of types of computer-readable storage medium 306. The data may be loaded from the storage medium 306 into a memory 308 to be accessed by the processor(s) 304. The computer-readable storage medium 306 (also referred to as a processor-readable medium or storage) includes any non-transitory medium (e.g., a tangible medium) that participates in providing instructions or other data that may be read by the processor 304 of the telematics controller 302. Computer-executable instructions may be compiled or interpreted from computer programs created using a variety of programming languages and/or technologies, including, without limitation, and either alone or in combination, JAVA, C, C++, C#, OBJECTIVE-C, FORTRAN, PASCAL, JAVASCRIPT, PYTHON, PERL, and PL/SQL.

An embedded modem 310 may be a component of the vehicle 102 configured to facilitate communication by the vehicle 102 over a communications network 312. The communications network 312 may provide communications services, such as packet-switched network services (e.g., Internet access, VoIP communication services), to devices connected to the communications network 312. An example of a communications network 312 may include a cellular telephone network. For instance, the embedded modem 310 may access the cellular network via connection to one or more cellular towers 314. To facilitate the communications over the communications network 312, the embedded modem 310 may be associated with unique device identifiers (e.g., mobile device numbers (MDNs), Internet protocol (IP) addresses, etc.) to identify the communications of the embedded modem 310 on the communications network 312 as being associated with the vehicle 102. To support the telematics services, the telematics controller 302 may utilize the embedded modem 310 to facilitate networked communication between the vehicle 102 and devices external to the vehicle 102. In other examples, the telematics controller 302 may communicate with the communications network 312 via a network connection of a mobile device (not shown) connected to the telematics controller 302 via a local wireless transceiver (not shown).

A vehicle bus 316 may include various methods of communication available between the telematics controller 302 and other components of the vehicle 102. For instance, the vehicle bus 316 may include one or more of a vehicle controller area network (CAN), an Ethernet network, and a media-oriented system transfer (MOST) network.

A V2V transceiver 318 may be a component of the vehicle 102 configured to facilitate one-way or two-way wireless communication over frequencies and protocols specifically designed for automotive use. In an example, the V2V transceiver 318 may be configured to facilitate Intelligent Transportation System capabilities. V2V and its wireless component, wireless access in vehicular environments (WAVE) protocol, operate within a 75 megahertz (MHz) bandwidth of the 5.9 GHz frequency spectrum band. The allocated bandwidth is generally divided into one control channel (CCH) used to broadcast safety messages and announce available services and four to six service channels (SCHs) used for subsequent communication between the broadcasted service provider and a service user. It should be noted that while the V2V transceiver 318 and embedded modem 310 are illustrated herein as separate components, in some examples, the functionality of the V2V transceiver 318 and embedded modem 310 may be performed by a combined V2V/cellular transceiver device.

The global navigation satellite system (GNSS) receiver 320 may be a component of the vehicle 102 used to provide geo-spatial positioning information for the vehicle 102. As some examples, the GNSS receiver 320 may be configured to receive positional data via Global Positioning System (GPS), the GLObal NAvigation Satellite System (GLO-NASS), the BeiDou Navigation Satellite System (BDS), and/or the Galileo positioning system.

The telematics controller 302 may receive input from various sensors. In an example, the telematics controller 302 may be in communication with LiDar sensors 334. In another example, the telematics controller 302 may additionally or alternately be in communication with laser, radar, sonar, or other types of distance and/or obstacle sensors. The telematics controller 302 may be in communication with one or more camera 336 devices configured to capture information regarding the surroundings of the vehicle 102. A traffic operation controller 322 may also receive in-car networking data from other vehicle controllers via the vehicle bus 316.

The vehicle 102 may further include a human-machine interface (HMI) 338. The HMI 338 may utilize a voice interface to provide a hands-free interface to the vehicle 102. The voice interface may support speech recognition from audio received via the microphone according to a grammar of available commands, and voice prompt generation for output via a speaker or other audio output. In some cases, the system may be configured to temporarily mute, fade, or otherwise override an audio source specified by an input selector when an audio prompt is ready for presentation by the HMI 338 and music or other audio is selected for playback. The HMI 338 may also receive input from human-machine interface (HMI) controls configured to provide for occupant interaction with the vehicle 102. For instance, the HMI 338 may interface with one or more buttons or other HMI controls configured to invoke vehicle 102 functions (e.g., steering wheel audio buttons, a push-to-talk button, instrument panel controls, etc.). The HMI 338 may also drive or otherwise communicate with one or more displays configured to provide visual output to vehicle occupants. In some cases, the display may be a touch screen further configured to receive user touch input, while in other cases the display may be a display only, without touch input capabilities.

The telematics controller 302 may be configured to perform the processing functions required to manage contested roadway areas 106. To perform these operations, the telematics controller 302 may utilize the processors 304 to execute computer instructions of a traffic application 330, using map data 332 and priority rules 344.

The traffic control application 330 may be an application installed to the storage medium 306 of the telematics controller 302. When executed by the telematics controller 302, the traffic control application 330 may be configured to identify a location of the vehicle 102 using the GNSS receiver 320, and utilize the location to provide navigation directions along a route. In an example, the directions may be provided to the telematics controller 302 or to fully autonomous driving systems to direct the vehicle 102. In another example, the vehicle 102 may be driven by an operator, and may receive information regarding the vehicle 102 position and direction from the vehicle controllers over the vehicle bus 316.

Map data 342 may be information maintained to the storage 306 of the telematics controller 302. The map data 342 may include information that may be queried to provide map information to a viewer of the display. As one example, the telematics controller 302 may load the map data 342, as needed, off a digital versatile disk (DVD). As another example, the telematics controller 302 may maintain the map data 342 on flash or HDD storage. The map data 342 may include, for example, information regarding roads that may be traversed by the vehicle 102 (e.g., location, name, endpoints, speed limit, traffic, etc.), as well as geographic features of the area surrounding the roadway 104 (e.g., water, parks, desert, mountains, building outlines, etc.).

The traffic control application 330 may further include instructions to cause the telematics controller 302 to utilize the map data 342 to identify routes for the vehicle 102. As an example, the traffic control application 330 may be configured to identify a path along the road segments of the map data 342 from a current vehicle 102 location (or user-specified start location) to a location the driver wishes to reach. The traffic control application 330 may be further configured to display the route in the HMI 338 of the vehicle 102, such as by way of a highlighted path overlaid on the displayed map data 342, and/or as a listing of one or more driving instructions that, when followed, take the vehicle 102 to the intended destination or waypoint point of interest (POI).

Operationally, the traffic control application 330 may also include instructions that cause the telematics controller 302 to process data received from the sensors (e.g., LiDAR 334, camera 336, etc.) and determine road topology according to the data. For instance, the traffic control application 330 may perform feature detection on the received data to identify information relevant to lane locations or structure from sensor data. This information might include line markers in the roadway 104, painted features of the roadway 104, curbs, or street signs indicating road structure as some possibilities.

This road feature information may be interpreted by a lane analyzer of the traffic control application 330, which attempts to fit the current identified information into a continuous representation of a lane based on prior received data. For instance, the tracking may include attempting to fit the identified information to a model of the roadway 104, such as a line, a curve, a parabola, or some other possible simple shape. A result of this processing may be topology data that includes information indicative of the structure of the roadway 104 ahead, such as lane positions and curving of the roadway 104. Accordingly, the traffic control application 330 may allow the vehicles 102 to be modeled as traveling within defined lanes of the roadway 104.

The traffic control application 330 may additionally include instructions to facilitate communication between the vehicles 102 and other vehicles 102. In an example, the traffic control application 330 may allow the vehicles 102 to communicate with one another over the communications network 312, or directly via the V2V transceiver 318.

It should be noted that there may be traffic participants 204 other than vehicles 102. For instance, roadway infrastructure 340, such as traffic lights, may impose limitations on the use of roadway 104. The roadway infrastructure 340 may be connected to the communications network 312 to provide that state information to the system. As another example, pedestrians may also be traffic participants 204. For instance, a pedestrian may require use of a roadway 104 crossing to travel from one side of the roadway 104 to the other side. However, to be a traffic participant 204 in roadway conflict detection and resolution, the traffic participant 204 requires connectivity. In some cases, this connectivity may be provided by a mobile device carried by the pedestrian, such as the user's mobile phone. In other cases, this connectivity may be provided by cameras or other roadway infrastructure 340 configured to represent the passenger in the system, e.g., to operate as a stand-in for the passenger. For instance, the roadway infrastructure 340 may indicate the location of the pedestrian, and/or the intent of the pedestrian, e.g., based on the pedestrian pressing a walk button at a stoplight.

The vehicles 102 and (other traffic participants 204) may be configured to provide position and future path information to other traffic participants 204. This information may be made available through periodic or event-based exchanges of messages sent from each vehicle 102. In an example, the traffic control application 330 may include instructions to cause the position and path information to be broadcast from the vehicle 102 via the embedded modem 310 and/or V2V transceiver 318. For instance, each vehicle 102 may be configured to continuously broadcast current state information (e.g., location, speed, acceleration, vehicle mass, and dimensions), as well as intended future routing selection (e.g., turn signal information, indications of future roadway lane use, etc.).

This information may allow each of the traffic participants 204 to be modeled for performance of vehicle path predictions by nearby vehicles 102 receiving the information. In an example, the traffic control application 330 may include instructions to generate vehicle path predictions for nearby vehicles 102 based on current positions, velocities, and accelerations of each vehicle 102. These predictions may be updated responsive to new information becoming available from other vehicles 102 broadcasting their information.

Using the broadcast information, the expected path of a vehicle 102 may be calculated, by the other local vehicles 102, for a time period from the current vehicle state and intended future routing information. A sufficiently large time period is one that allows negotiation and the effect of the response to the negotiated outcome to be completed.

Each vehicle 102 or other traffic participant 204 may perform these calculations independently. Notably, as the vehicles 102 each use the same information about the vehicles 102, and as each uses the same traffic application 330 algorithm, each vehicle 102 may arrive at the same conclusions even without sharing those conclusions with the other vehicles 102.

The traffic application 330 may include instructions that cause the vehicle 102 to perform the role of conflict detector 210. A conflict in this instance may refer to concurrent use of a shared asset 206, such as a contested roadway area 106. In an example, each of the connected vehicles 102 may independently calculate a potential for conflict by continuously evaluating future paths of all nearby vehicles 102 via the traffic application 330. Accordingly, as multiple vehicles 102 concurrently identify the conflict, the conflict detector 210 functionality may be implemented in part by each vehicle 102, without a central authority.

If a conflict is detected, a local conflict event is generated. Each vehicle 102 detecting the conflict may broadcast a high priority warning message to nearby vehicles 102. In an example, the warning message may be broadcast via DSRC using the V2V transceiver 318. In another example, the warning message may be broadcast via cellular communication using the embedded modem 310. Regardless of protocol, this warning message may be referred to as a virtual horn that indicates presence of the vehicle 102 for the conflict.

Responsive to two or more vehicles 102 generating a local conflict event, the traffic application 330 may engage instructions that when executed are configured to perform the role of conflict resolver 212. Notably, a conflict resolution may be unable to commence until the conflict has been recognized by all affected vehicles 102.

Figure 4:
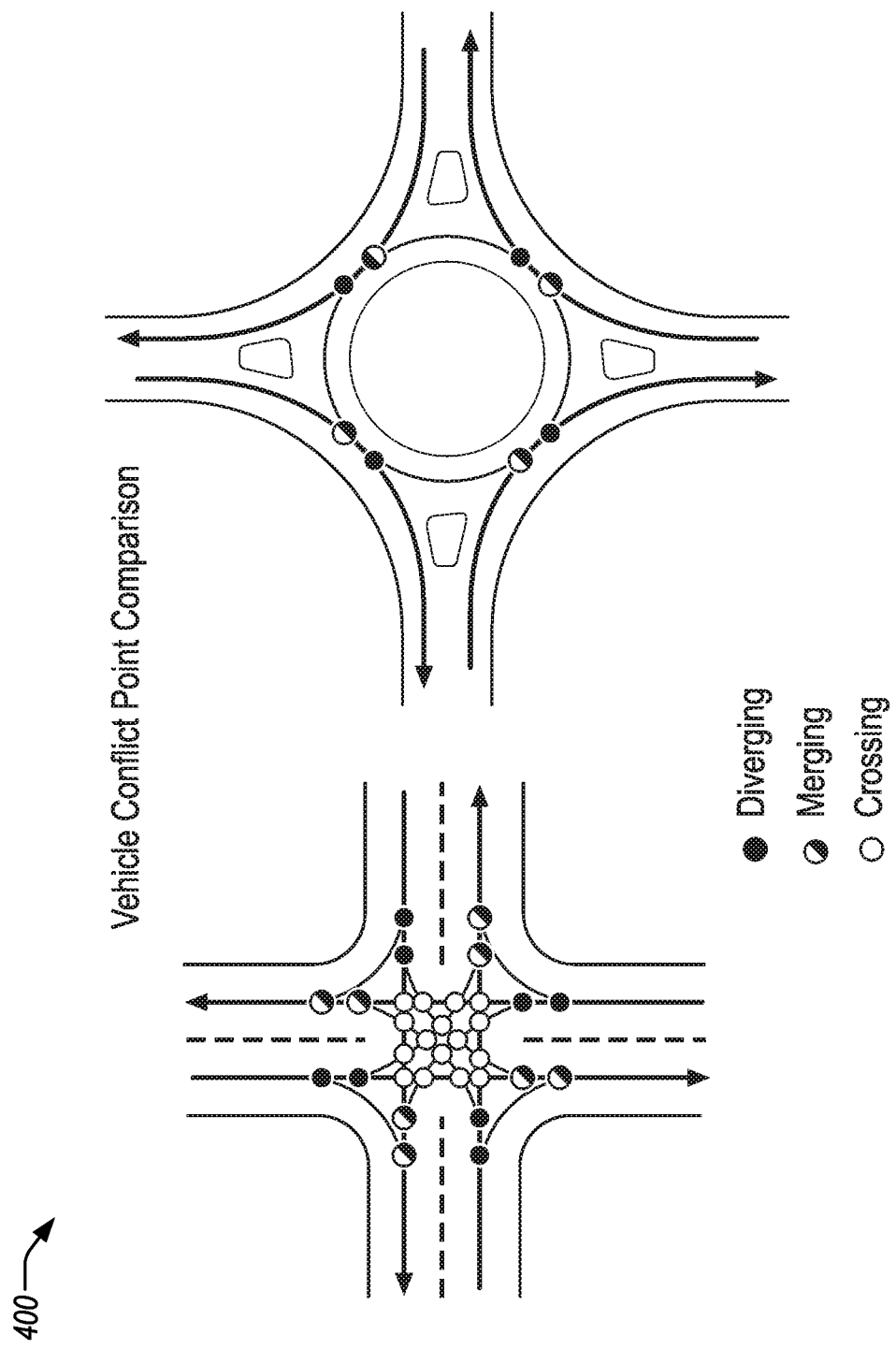
FIG. 4 illustrates example diagrams of map data that may be used to support local conflict detection.

FIG. 4 illustrates example diagram of map data 342 that may be used to support local conflict detection. As shown, conflict points exist at intersections such as roundabouts, three-way intersections (T junctions, Y junctions including merging lanes), four-way intersections, and pedestrian crosswalks. The local conflict detection may be performed using roadway segment geometry and attributes from the map data 342 in combination with the information about current and predicted vehicle paths to identify times and locations when a potential for concurrent vehicle 102 roadway access exists, referred to sometimes as a conflict point.

The conflict resolution may be initialized with the local conflict event data which specifies the predicted time and place of the conflict point. To resolve the conflict, a communication-based dynamic traffic control system may be initiated. The resolution process may consist of a sequence of assigning locks, defined as ownership of a contested area to each vehicle 102 requesting access, one vehicle 102 at a time, according to a prioritization algorithm that ensures cooperative understanding of the locks through communication.

The assignment of the lock in this context is equivalent to being given a so-called green light, e.g., permission to use the roadway segment. Responsive to the vehicle 102 having cleared the contested roadway area 106, the lock is released and ownership of the contested roadway area 106 is assigned to the next vehicle 102, as determined by the prioritization algorithm of the traffic application 330. Any vehicle 102 contesting an area 106 which does not own the lock will be given a so-called red light, i.e., being denied entry to the roadway segment.

Referring back to FIG. 3, the prioritization algorithm of the traffic application 330 may be programmed to operate according to priority rules 344. These priority rules 344 may take into account local laws, safety overrides, considerations of efficiency (optimization), vehicles 102 with inherent privileges (for example emergency and maintenance vehicles) or earned privileges. Earned privileges may be assigned to a vehicle 102 based on occupancy numbers (high-occupancy vehicle (HOV)), propulsion type (for example electric, gasoline, or diesel engines), or payment (micro toll payments).

As a specific example, certain privileged vehicles 102 may be given special treatment in the prioritization algorithm. Examples of such vehicles 102 may include emergency vehicles 102, maintenance vehicles 102, vehicles 102 operating in a funeral procession, or vehicles 102 having purchased special access passes. The authenticity of privileges can be confirmed with a cryptographically secured token, issued by a traffic control system authority. Such tokens may be limited to a specific geographic area and to a specified time period. In an example, the traffic application 330 may be programmed to validate any such permissions according to the tokens.

The ledger 218 may be utilized to maintain the state of each detected contested roadway area 106. The state value is the current owner(s) of the contested roadway area 106. Only an owner of a contested region has permission to move into the contested roadway area 106. A transaction recorded to the ledger 218 may indicate such a change in state of a contested roadway area 106, responsive to consensus of the proposed state change having been reached by the vehicles 102 contesting the roadway area 106 (or potentially by other connected vehicles 102 of the system 300).

In an example, the ledger 218 may be implemented as a distributed ledger. A blockchain is an example of a tamper-evident, shared digital ledger 218. The blockchain is used to record transactions in a public or private peer-to-peer network. The ledger 218 may be distributed to member nodes of the blockchain network. Regarding the content of the ledger 218, the ledger 218 permanently records, in a sequential chain of cryptographic hash-linked blocks, a history of asset exchanges that take place between peers in the network. For instance, the Hyperledger Fabric Chaincode program ("smart contract") may be utilized to support the functionality of the ledger 218. Similar to a blockchain ledger, the transactions may be stored in a transaction graph, such as the "tangle" in the IOTA protocol.

A distributed ledger framework may, accordingly, be used to implement aspects of the conflict resolver 212 as a permissioned private network. Each node of the network has a member identity on the network, such that each participant is authorized and authenticated to use the network by the identity manager 222. Participants in the network may then interact with the distributed ledger such that their transactions and data are restricted to an identified subset of network participants, known as a channel. There is one ledger 218 per channel, and each peer maintains a copy of the ledger 218 for each channel of which they are a member. For instance, each traffic infrastructure 202 may have its own corresponding ledger subset. In addition, to ensure security of the distributed ledger, only identical and authenticated code may be permitted to execute in the network.

The distributed ledger contains state data, which may be referred to as a world state. Various storage mechanisms may be used to maintain the world state. In an example, the world state may be stored using an embedded key/value implementation, such as that provided by the LevelDB storage library made available by Google LLC of Mountain View, Calif. In another example, the world state may be stored using a backend that permits queries by indexed JSON formatted values, such as the CouchDB library made available by the Apache Software Foundation of Forest Hill, Md.

Figure 5:
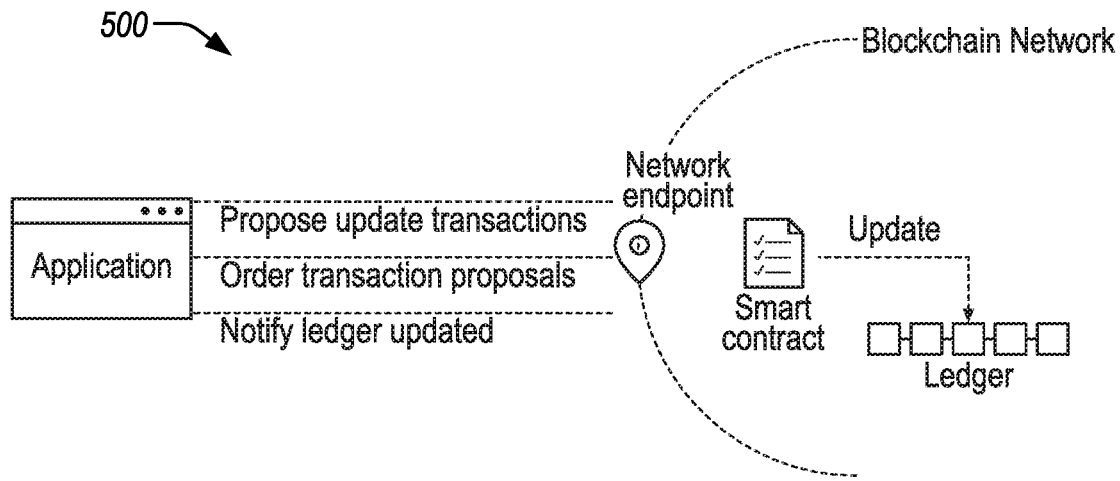
FIG. 5 illustrates an example of distributed code of the traffic application being used to create a distributed ledger for use in the storage of the transactions.

FIG. 5 illustrates an example of distributed code of a traffic application 330 being used to create a distributed ledger for use in the storage of the transactions.

The distributed code may be used to define the data elements of the model 200 discussed in detail above, as well as the transaction instructions for modifying the data elements. Additionally, the districted code implements the rules for reading or altering key-value pairs or other state database information. The distributed code may execute against the current state database of the ledger 218 as initiated through a transaction proposal. Execution of the distributed code against the current state results in a set of key-value writes (write set) that can be submitted to the network and applied to the ledger 218 on all peers.

The ledger 218 is the sequenced, tamper-resistant record of all state transitions in the fabric. State transitions are a result of transactions being submitted by participating parties. Each transaction results in a set of asset key-value pairs that are committed to the ledger 218 updates in the form of creates, updates, or deletes to the information of the ledger 218. The ledger 218 includes a list of transactions as well as a state database to maintain a current world state.

Figure 6:
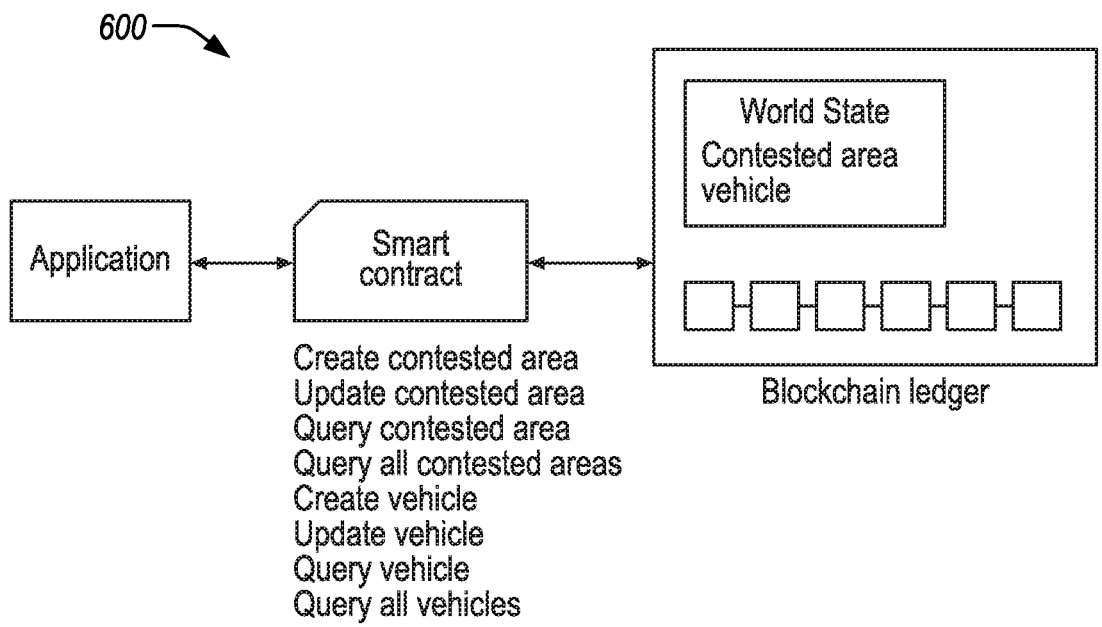
FIG. 6 illustrates a diagram of management of shared resources using a world state hash table to record transactions in a ledger.

FIG. 6 illustrates a diagram 600 of management of shared resources using a world state hash table to record transactions in a ledger 218. In the illustrated diagram 600, the ledger 218 may maintain the state of each detected contested region 106. The state value is the current owner(s) of a contested region 106. Only an owner of a contested region 106 has permission to move into the region 106. A change in one such state is a transaction recorded in the distributed ledger, when consensus (of the proposed state change) has been reached by the participants.

The smart contract may include an API that may be used to control the contested areas 106. For example, the API may allow for the traffic application 330 to create contested roadway areas 106, update contested roadway areas 106, query contested roadway areas 106, query for all contested roadway areas 106, create a vehicle 102, update a vehicle 102, query a vehicle 102, or query for all vehicles 102. By the vehicles 102 honoring the contested areas 106, the system serves as the traffic control system until the conflict has been resolved, which occurs when there are no more contested areas 106.

Additionally, for the duration of the conflict period (existence of the contested roadway area 106), region ownership assignments along with vehicle signals (such as steering wheel angle, wheel speeds, brake status, turn signal indicators, etc.) may be recorded on the ledger 218 by the traffic application 330 as a list of transactions with encrypted content. Thus, the ledger 218 may further include an unalterable record of the negotiated contract agreed to by all vehicles 102, as well as a record of the actual events that took place.

When the conflict period ends without an incident, this record of the contract period may be purged from the ledger 218. If an incident does occur, where a vehicle 102 path significantly deviates from agreed-upon solution and leads to a collision, the information on the local ledger 218 is preserved and transmitted to a central service for a digital forensic investigation. Vehicle events such as air bag deployment or abnormal acceleration sensor reading can be used to automatically trigger preservation of the records. Deviations from the negotiated contract may have resulted from intentional or unintentional inappropriate action by the vehicle operator (human or computer), transient infrastructure change (caused by weather or natural events), by vehicle malfunction, vehicle design fault etc.

Figure 7A:
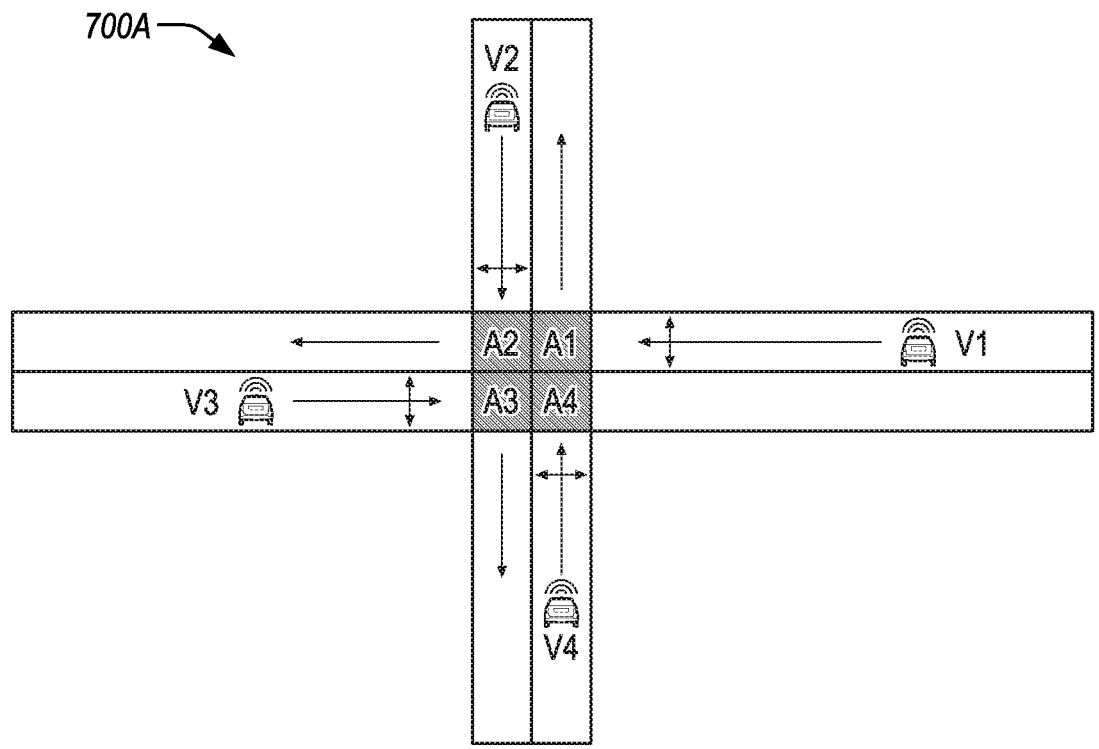
FIG. 7A illustrates a detailed example of a conflict at a four-way intersection.
Figure 7B:
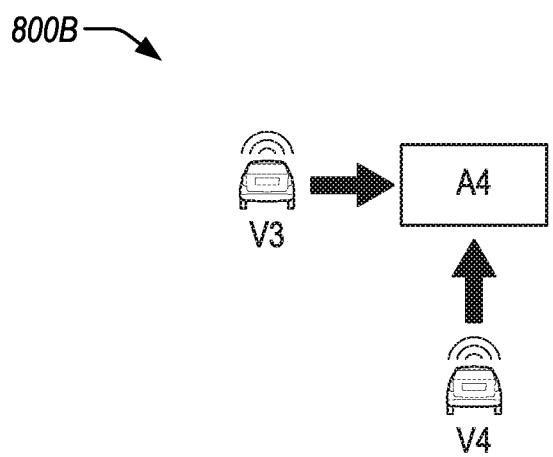
FIG. 7B illustrated an example portion of the intersection highlighting a single contested area.

FIG. 7A illustrates a detailed example 700 of a conflict at a four-way intersection. FIG. 7B illustrates an example portion of the intersection highlighting a single contested area. As shown, vehicles V3 and V4 are arriving at roadway area A4 concurrently, where area A4 is a contested area 106 part of the intended path of both vehicles V3 and V4. As no vehicles 102 are requiring its use for their expected travel, prior to arrival of vehicles V3 and V4 to the intersection, the roadway segment A4 is not owned. Responsive to detecting a conflict in area A4, vehicle V3 and vehicle V4 become parties to a contract of passage.

Using the methods described herein, the traffic application 330 first assigns exclusive ownership of A4 to V4. Responsive to this assignment, the V3 must avoid accessing A4. As V4 has access, V4 completes passage through A4, and the V4 leaves area A4. Next, ownership of A4 is reassigned to the vehicle V3. V3 then completes passage through A4. Responsive to vehicle V3 leaving area A4, area A4 is no longer owned.

Table 1 illustrates an example transaction table showing ownership assignment of the roadway shared asset 206 of A4 in accordance with the example. As can be seen, each transaction is assigned a unique random identifier and is date-stamped to explain the ordering of the assignments from null (no owner), to V4, to V3, and back to null.

TABLE 1

Transaction table showing ownership assignment of a roadway asset to a road user

| Transaction [UUID] | Area [label] | Owner | Time [ms] |
| --- | --- | --- | --- |
| c11308e4-91c5-4dcb-b07e-d125a494611f | A4 | null | 1538062921355 |
| 079624ce-60ca-438f-a4b7-770514fd44b4 | A4 | V4 | 1538062987349 |
| b2f5746f-4ff6-4ec1-8ab3-db19f16658e8 | A4 | V3 | 1538063012076 |
| 6803be24-c887-4f60-9ffa-30ffac7a52c6 | A4 | null | 1538063022523 |

It should be noted that the ordering of assignment of ownership may vary. For example, higher priority may be given to vehicles 102 approaching from the right. The priority rules 344 may be used to identify how to proceed with ordering the vehicles 102. Regardless of the ordering, any vehicle 102 requesting access to A4 is subjected to and is assumed to have accepted the terms of the intersection dynamic traffic control system in effect.

As another view, Table 2 illustrates an example title table showing current ownership of the roadway shared asset 206. Data such as that in Table 2 may be queried using the query all contested areas API function, in an example. This data may be useful in allowing a vehicle 102 to understand what areas are currently contested.

TABLE 2

Current ownership of roadway assets

| Roadway asset [UUID] | Roadway asset label | Current owner | Time of ownership assignment [ms] |
|---|---|---|---|
| 4d0d2365-93a6-431d-abe1-f5eb1e6daf83 | A4 | V1 | 1538062921355 |
| 96ead917-bf8c-4adc-a6e8-6a084586ff92 | A2 | V1 | 1538062987349 |
| 6803be24-c887-4f60-9ffa-30ffac7a52c6 | A3 | V3 | 1538063022523 |

Figure 8:
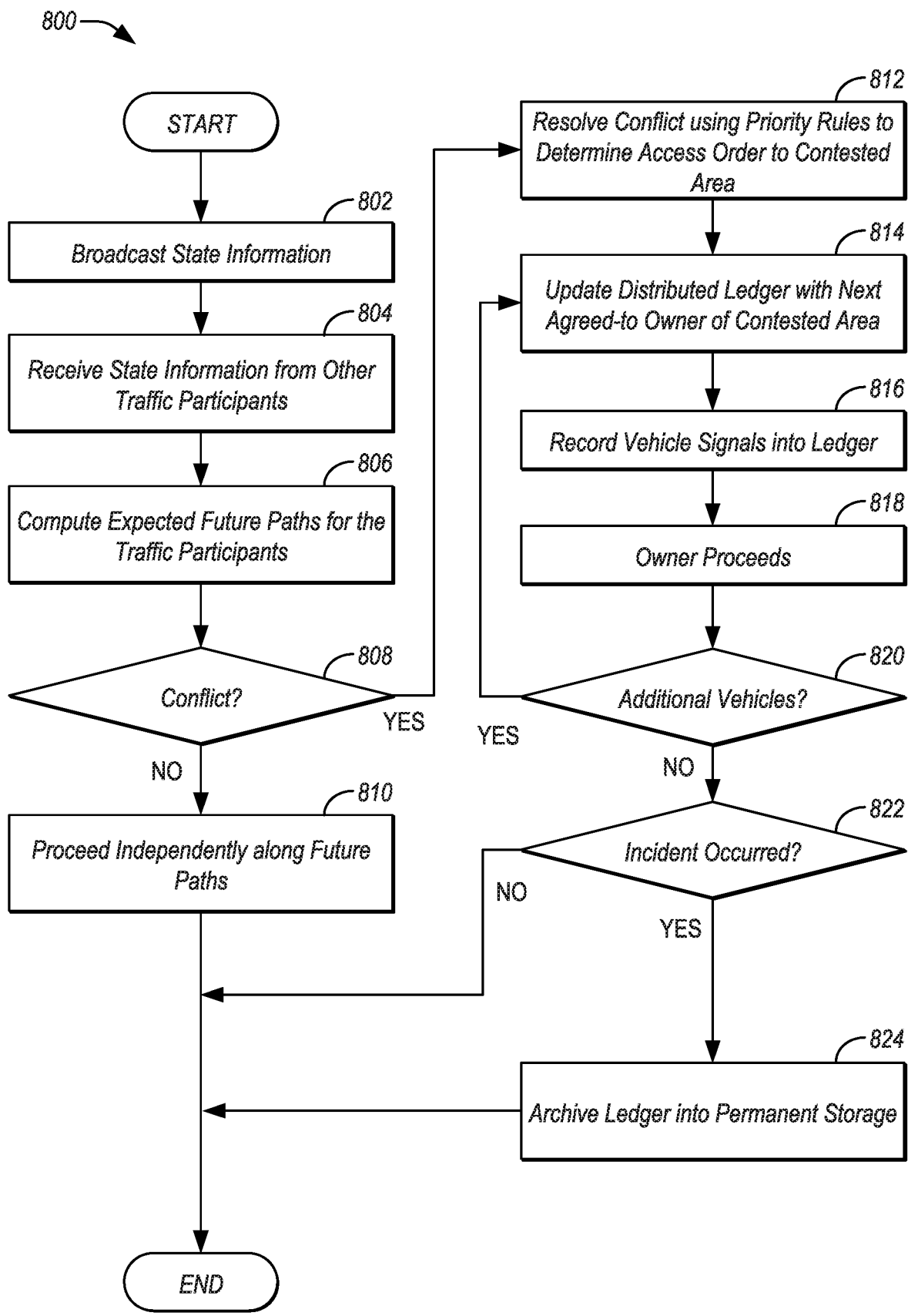
FIG. 8 illustrates an example process for roadway conflict detection and resolution.

FIG. 8 illustrates an example process 800 for roadway conflict detection and resolution. In an example, the process 800 may be performed by the vehicle 102 executing the distributed traffic application 330 and using the distributed ledger 218. Notably, while the process 800 is described from the point of view of a single vehicle 102, it should be noted that the process 800 may also be performed by each of the other vehicles 102 operating to perform the roadway conflict detection and resolution.

At operation 802, the vehicle 102 broadcasts state information. This state information may include, as some examples, location, speed, acceleration, mass, dimensions, and/or future routing information for the vehicle 102. The state information may be broadcast using V2V using the V2V transceiver 318 and/or may be broadcast using the embedded modem 310 (e.g., to be received by any other traffic participants connected to the same cellular tower 314). At 804, the vehicle 102 receives similar state information broadcast from other vehicles 102. It should be noted that the vehicles 102 may broadcast this information continuously.

At 806, the vehicle 102 computes expected future paths for the traffic participants. In an example, the vehicle 102 may utilize the received state information from the other vehicles 102 to identify an expected future route of each traffic participant 204 of sufficient duration to be useful in evaluating whether there is a possibility of occurrence of a roadway conflict.

At operation 808, the vehicle 102 determines whether a conflict exists. A conflict exists whenever there is an imminent concurrent access to a shared asset 206 by two or more traffic participants 204 (e.g., a contested roadway area 106). This may be determined using the computed expected future paths computed at operation 806. If no conflict is detected, control passes to operation 810 to allow the vehicle 102 to proceed independently along its future path. Otherwise, if a conflict is detected, control passes to operation 812.

The vehicle 102 resolves the conflict using priority rules 344 at operation 812 to determine an access order to the contested roadway area 106. These priority rules 344 may take into account local laws, safety overrides, considerations of efficiency (optimization), vehicles 102 with inherent privileges (for example emergency and maintenance vehicles) or earned privileges. Notably, each vehicle 102 in the conflict is programmed to independently determine the resolution to the conflict. Moreover, as each vehicle 102 uses the same information and the same algorithms, each vehicle 102 should independently come to the same conclusion regarding how to resolve the conflict.

At 814, the vehicle 102 updates the distributed ledger 218 with the next agreed-to owner of the contested roadway area 106. This updating of the updates the distributed ledger 218 may accordingly require the consensus of each of the vehicles 102 independently determining that the same vehicle 102 should proceed next.

The vehicle 102 records vehicle signals into the ledger 218 at 816. These vehicle signals include information about the operation of the vehicle 102, such as steering wheel angle, wheel speeds, brake status, turn signal indicators, and so on. This information may be recorded on the ledger 218 by the traffic application 330 as a list of transactions with encrypted content. Thus, the ledger 218 may further include a record of the actual events that took place, in addition to an unalterable record of the negotiated contract agreed to by all vehicles 102.

At 818, the owner of the contested roadway area 106 proceeds. At operation 820, the vehicle 102 determines whether additional vehicles 102 remain that require use of the contested roadway area 106. If so, control returns to operation 814. An example of ownership assignments of a roadway asset is described above with respect to Table 2.

At operation 822, the vehicle 102 determines whether an incident occurred. An incident may include a traffic accident, or another unexpected occurrence, such as a vehicle 102 being at a location deviated from the expected future path. If an incident occurs between traffic participants 204, the forensic agent entity 224 may be able to utilize the ledger 218 to reconstruct the timeline surrounding the incident. If an incident occurs, control passes to operation 824 to store the recorded vehicle signals into the distributed ledger 218. If no incident occurs, control passes to operation 826 to update the distributed ledger 218 to remove the contested area 106, and then to operation 826 to discard the recorded vehicle signals. After operations 810, 824, or 828, the process 800 ends.

In general, computing systems and/or devices, such as the telematics controllers 302, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVASCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the telematics controller 302 and other computing devices may be such computer program products (e.g., the traffic application 330, etc.). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a controller programmed to
       broadcast state information for the vehicle and receive state information from other vehicles;
       identify a contested roadway area for the vehicle and another of the vehicles based on expected future paths of the vehicle and the other vehicle calculated per the state information;
       update a ledger with an indication of which of the vehicle or the other vehicle is agreed to proceed through the contested roadway area as well as with vehicle signals to be used for forensic analysis of operation of the vehicles at the contested roadway area, the vehicle signals indicative of steering angle, speed, and brake actions; and
       discard the vehicle signals by removal of the vehicle signals from the ledger responsive to the vehicle and the other vehicle successfully traversing the contested roadway area.

2. The vehicle of claim 1, wherein the controller is further programmed to:
    raise a local conflict event if the future paths create the contested roadway area for the vehicles;
    broadcast the conflict event to the vehicles; and
    initiate conflict resolution responsive to receiving a conflict event broadcast from the other vehicle affected by the contested roadway area.

3. The vehicle of claim 1, wherein the state information includes one or more of location, speed, acceleration, mass, and dimensions of the vehicles.

4. The vehicle of claim 1, wherein the controller is further programmed to maintain map information and use the map information to identify the expected future paths from the state information.

5. The vehicle of claim 1, wherein the controller is further programmed to access priority rules to determine an order of access of the vehicle and the other vehicle to the contested roadway area.

6. The vehicle of claim 5, wherein the priority rules indicate traffic laws, directives by governing departments of transportation (DOT), and inherent or earned elevated privileges of passage for particular vehicles.

7. A method comprising:
    responsive to detecting a conflict between traffic participants for use of a contested roadway area, performing distributed conflict resolution by the traffic participants to identify an ordering of the traffic participants to have exclusive access to the contested roadway area;
    using a distributed ledger to record agreement of the traffic participants to the ordering;
    recording, into the ledger, signals representative of movement of the traffic participants within the contested roadway area; and
    discarding the signals by removal of the signals from the ledger responsive to the traffic participants successfully traversing the contested roadway area.

8. The method of claim 7, wherein one or more of the traffic participants is a vehicle.

9. The method of claim 7, wherein one or more of the traffic participants is a pedestrian, and further comprising utilizing roadway infrastructure to represent a location of the pedestrian for performing the distributed conflict resolution.

10. The method of claim 7, further comprising, for each traffic participant, broadcasting occurrence of the conflict to another of the traffic participants and initiating the distributed conflict resolution responsive to receiving the broadcast of the conflict from the other traffic participants affected by the contested roadway area.

11. The method of claim 7, further comprising broadcasting state information for one of the traffic participants and receiving broadcast state information from another of the traffic participants, wherein the state information includes one or more of location, speed, acceleration, mass, and dimensions of the traffic participants.

12. The method of claim 11, further comprising maintaining map information and using the map information to identify expected future paths of the traffic participants from the state information for detecting the conflict.

13. The method of claim 7, further comprising accessing priority rules to determine the ordering of the traffic participants.

14. A non-transitory computer-readable medium comprising instructions of a dynamic traffic control system for performing distributed conflict resolution that, when executed by processors of traffic participants, causes the traffic participants to:
- broadcast state information for one of the traffic participants;
- receive broadcast state information from other traffic participants;
- use maintained map information to identify expected future paths of the traffic participants per the state information;
- responsive to detecting a conflict between the traffic participants for use of a contested roadway area, perform distributed conflict resolution by the traffic participants to identify an ordering of the traffic participants to have exclusive access to the contested roadway area;
- use a distributed ledger to record agreement of the traffic participants to the ordering;
- record, into the ledger, signals representative of movement of the traffic participants within the contested roadway area; and
- discard the signals responsive to the traffic participants successfully traversing the contested roadway area.

* * * * *